United States Patent [19]

Bartholomew et al.

[11] Patent Number: 4,944,323
[45] Date of Patent: Jul. 31, 1990

[54] TIRE PRESSURE INDICATOR

[75] Inventors: Alan Bartholomew, Newton; Jack J. Williams, Great Bend, both of Kans.

[73] Assignee: Wagnon Power Jack, Inc., Great Bend, Kans.

[21] Appl. No.: 133,613

[22] Filed: Dec. 16, 1987

[51] Int. Cl.$^5$ ............................................. F16K 37/00
[52] U.S. Cl. .................................. 137/227; 73/146.8; 116/34 R; 116/272; 137/234.5
[58] Field of Search ...................... 137/227, 229, 234.5; 116/34 R, 272; 73/146.8

[56] References Cited

U.S. PATENT DOCUMENTS

| | | | |
|---|---|---|---|
| 1,346,961 | 7/1920 | Jackson | 137/227 X |
| 2,451,276 | 10/1948 | Crowley | 137/234.5 |
| 3,670,688 | 6/1972 | Seaberg | 137/227 X |
| 3,712,328 | 1/1973 | McAnally | 137/234.5 |
| 3,719,198 | 3/1973 | Wilhelm et al. | 73/146.8 X |
| 3,789,867 | 2/1974 | Yabor | 73/146.8 X |
| 3,967,639 | 7/1976 | Mottram | 137/234.5 |
| 4,097,075 | 6/1978 | Clayton | 137/234.5 X |

Primary Examiner—Stephen Hepperle
Attorney, Agent, or Firm—John W. Carpenter

[57] ABSTRACT

A visual tire pressure indicator having a hollow outer body, an inner cap fitted within the outer body and an inner body secured to the inner cap and generally coaxial with the outer body. A pair of indicator sleeves is slidably disposed around the inner body. A pre-calibrated spring helically surrounds the inner body for biasing or urging the pair of indicator sleeves towards the inner cap. A valve core body is threadably engaged to top threads of the inner body while simultaneously being fitted snugly against an inner wall of the inner body. The valve core body has a longitudinal bore wherethrough air is passed to be emitted into a tire. A control rod has a valve core cap secured thereto and is slidably disposed in the longitudinal bore such that when it is depressed, air can be passed through the longitudinal bore. A valve core spring is positioned around the control rod and in the longitudinal bore to bias the control rod such that the core cap can seal-off the longitudinal bore.

16 Claims, 4 Drawing Sheets 4,944,323

TIRE PRESSURE INDICATOR

FIELD OF THE INVENTION

This invention is related to visual tire pressure indicators. More specifically, this invention provides a visual tire pressure indicator that connects to the valve stem of a vehicle tire to indicate to an operator the condition of inflation.

DESCRIPTION OF THE PRIOR ART

The following U.S. Patents were discovered in a patentability investigation: U.S. Pat. Nos. 3,230,968; 4,072,048; 4,193,295; 4,244,214; 4,310,014; and 4,520,664. None of the foregoing prior art teaches or suggests the particular tire pressure indicator of this invention.

SUMMARY OF THE INVENTION

The present invention accomplishes its desired object by broadly providing for a visual tire pressure indicator comprising an outer body having an inner wall, a transparent outer body section, a vent aperture, a top opening internally lined with top threads, and a bottom opening internally lined with bottom threads. An inner cap is fitted against the inner wall of the outer body and has at least one air inlet aperture wherethrough air is emitted and at least one air outlet aperture wherethrough air passes. An inner body has an outer wall, an inner wall and is secured to the inner cap. An indicator sleeve means is slidably disposed around the inner body; and a calibrated spring means helically surrounding the inner body for biasing the indicator sleeve means towards the inner cap. A valve core body is threadably engaged to the top threads and is fitted against the inner wall of the inner body. The valve core body has a structure defining a longitudinal bore. An air flow control rod is slidably disposed in the longitudinal bore; and a valve core cap is secured to the air flow control rod. The visual tire pressure indicator further comprises a valve core spring means disposed around the air flow contral rod and in the longitudinal bore for biasing the valve core cap against the valve core body.

It is therefore an object of the present invention to provide for a visual tire pressure indicator.

This, together with the various ancillary objects and features which will become apparent to those skilled in the art as the following description proceeds, is attained by this novel tire pressure indicator, a preferred embodiment being shown with reference to the accompanying drawings, by way of example only, wherein:

DETAILED DESCRIPTION OF THE INVENTION

Figure 1:
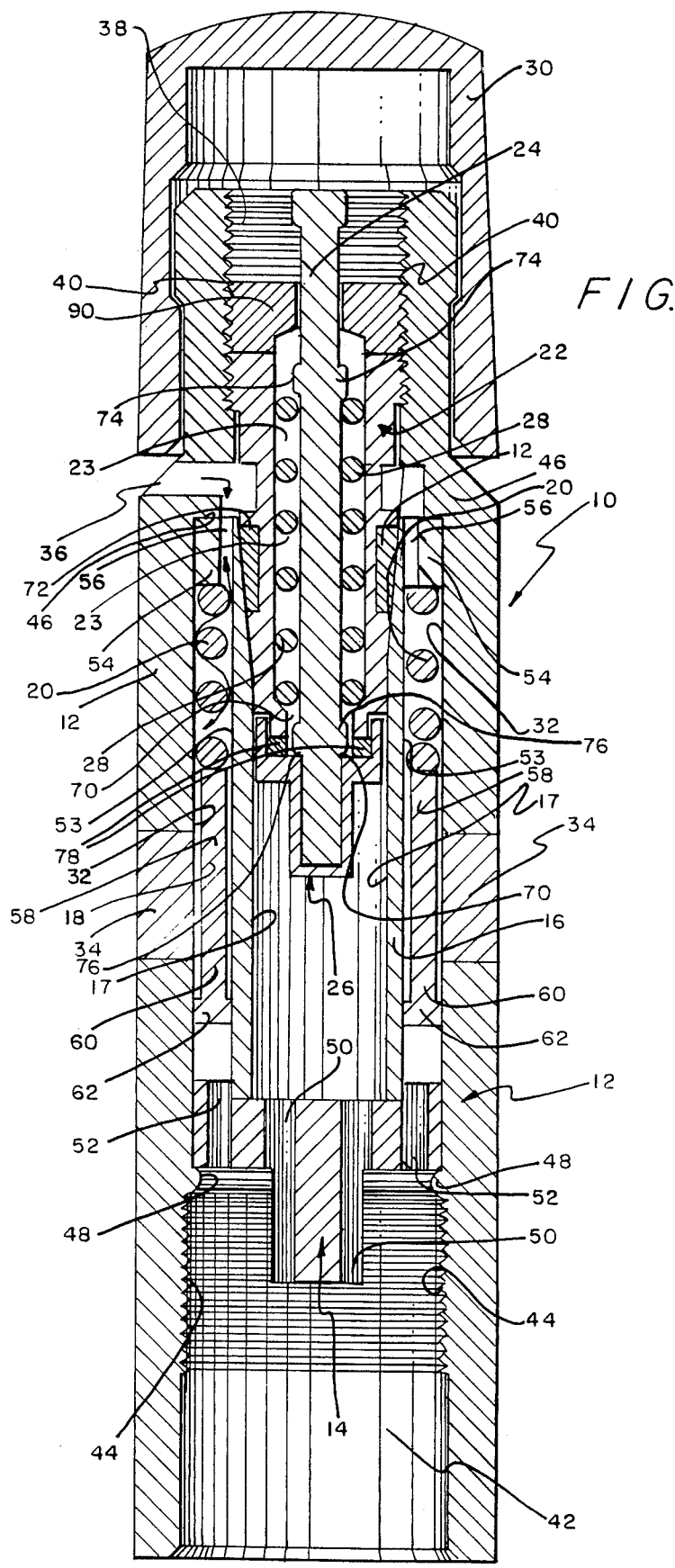
FIG. 1 is a vertical sectional view of the tire pressure indicator showing the upper sleeve visible through the transparent window and the tire, having the tire pressure indicator mounted to the valve stem thereof, being underinflated.

Referring in detail now to the drawings wherein similar parts of the invention are identified by like reference numerals throughout the various views, there is seen a tire pressure indicator, generally illustrated as 10, having a hollow outer body, generally illustrated as 12; an inner cap, generally illustrated as 14, fitted against the outer body 12; an inner body, generally illustrated as 16, having an inner wall 17 and secured to the inner cap 14; an indicator sleeve means, generally illustrated as 18, slidably disposed around the inner body 16; a calibrated spring 20 helically surrounding the inner body 16 for biasing the indicator sleeve means towards the inner cap 14; a valve core body, generally illustrated as 22, having a longitudinal bore 23 and threadably engaged to the outer body 12 and fitted within the inner body 16; an air flow control rod, generally illustrated as 24, slidably disposed in the longitudinal bore 23; a valve core cap, generally illustrated as 26, secured to the air flow control rod; and a valve core spring means 28 disposed around the air flow control rod 24 and in the longitudinal bore 23 for biasing the valve core cap 26 against the valve core body 22 for sealing off the longitudinal bore 23. A cap 30 is releasably engaged over the top of the hollow outer body 12.

The hollow outer body 12 has an inner wall 32, a transparent section or window 34 which can be seen through, a vent aperture 36, a top opening 38 internally lined around the circumference thereof with top threads 40, and a bottom opening 42 internally lined around the circumference thereof with bottom threads 44. The outer body 12 is formed with an inner ledge or recess 46 and has a protruding outer body collar 48 integrally bound to the outer body 12 and circumscribing the bottom opening 42 above the bottom threads 44. The bottom threads 44 threadably engage to the threads of a conventional valve stem (not shown in the drawings) of a tire (also not shown) of a car, truck, or the like.

The inner cap 14 is fitted against the inner wall 32 of the outer body 12 and is seated and flushed against the outer body collar 48. The inner cap 14 has inlet apertures 50 wherethrough air is emitted or introduced after passing through the longitudinal bore 23 and the inner body 16, and outlet apertures 52 wherethrough air from within an automobile tire (not shown) passes to pneumatically exert pressure against the indicator sleeve means 18 on the outside of the inner body 16.

Figure 6:
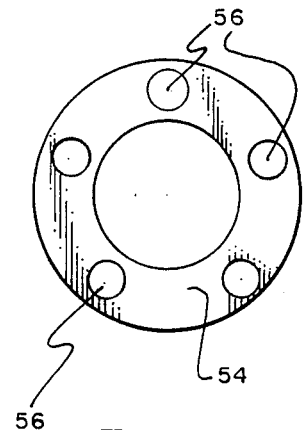
FIG. 6 is a top plan view of the inner body.

The inner body 16 has an outer wall 53 and terminates in an inner body collar 54 having collar apertures 56 (see FIG. 6) where air can be vented therethrough and through the vent aperture 36. Atmospheric air (and pressure) is allowed to pass to and from the volumetric space above the indicator sleeve means 18 and below the inner body collar 54 and between the outside at the inner body and the inner wall 32 of the inner body 16. As illustrated in the drawings, the circumferential top perimeter of the inner body collar 54 is lodged against the ledge or recess 46.

Figure 5:
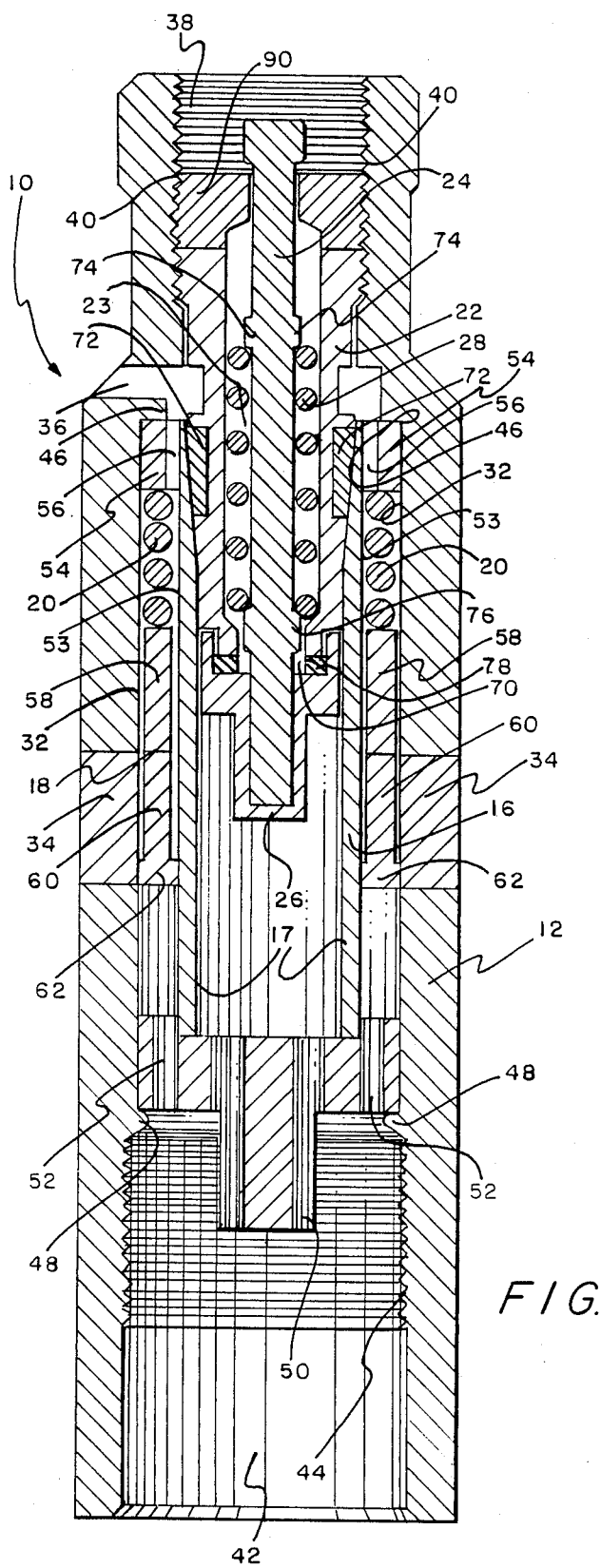
FIG. 5 is a vertical sectional view of the tire pressure indicator showing the position of the upper and lower indicator sleeve when a tire, having the tire pressure indicator mounted to a valve stem thereof, is properly pressurized.

The indicator sleeve means 18 preferably comprises an upper sleeve 58 and a lower sleeve 60 with a flanged sleeve bottom 62 that forms an airtight seal between the outer wall 53 of the inner body 16 and the inner wall 32 of the outer body 12. Typically, the upper sleeve 58 and the lower sleeve are manufactured of different colors. By way of example only, the sleeves 58 and 60 could be made such that the upper sleeve 58 is red and the lower sleeve 60 is green. When the red upper sleeve 58 is visible through the transparent window 34, such as in FIGS. 1 and 2, the automobile tire is underinflated. Typically, the sleeves 58 and 60 are held in contact by the pressure differential between the calibrated pressure of spring 20 and the pneumatic pressure exerted on the bottom of the flanged sleeve bottom 62 emanating through apertures 52 from within the tire (not shown in the drawings). Generally, the internal tire pressure is 26, 28, 30, etc., pounds per square inch. If the tire is properly inflated as shown in FIG. 5, only the green lower sleeve 60 is visible through transparent window 34.

The calibrated spring 20 is disposed between the inner body collar 54 and the indicator sleeve means 18 and is more particularly urging contact with the bottom of the inner body collar 54 and the top of the upper sleeve 58. The spring 20 can be calibrated for any desired pressure such as 24, 26, 28, 30, etc. pounds per square inch.

As depicted in the drawings, the valve core body 22 is more specifically threadably engaged to the top threads 40 that circumferentally line the top opening 38 of the outer body 12. The valve core body 22 is formed specifically with a threaded core head 90 wherethrough the control rod 24 slidably passes. The threaded core head 90 is secured threadably to the top threads 40. The valve core body is also snugly fitted against the inner wall 17 of the inner body 16.

The longitudinal bore 23 of the valve core body 22 tapers into a bottom core opening 70 that has a smaller diameter than the diameter of the bore 23. The valve core body 22 additionally includes a core gasket 72 embedded therein such as to be flushed against the inner wall 17 of the inner body 16 when the valve core body 22 is firmly fitted into the inner body 16.

The air flow control rod 24 has an upper ridge 74 and a lower ridge 76, both of which protrude away from the rod 24. The valve core spring 28 is disposed between the upper ridge 74 and the lower ridge 76 (as shown in drawings) and the bottom core opening 70, and is in biasing contact with the upper ridge 74 to bias the rod 24 upwardly from the valve core body 22.

The valve core cap 26 is secured to the bottom of the rod 24 below the lower ridge 76, and includes a gasket 78 that is secured thereto for sealing against the bottom of the valve core body 22 to seal-off the longitudinal bore 23 from the lower part of the inner body 16 which communicates pneumatically with the inside of the tire through apertures 50. With the valve core cap 26 seated as such, no air can escape from inside of the tire through the longitudinal bore 23.

Figure 7:
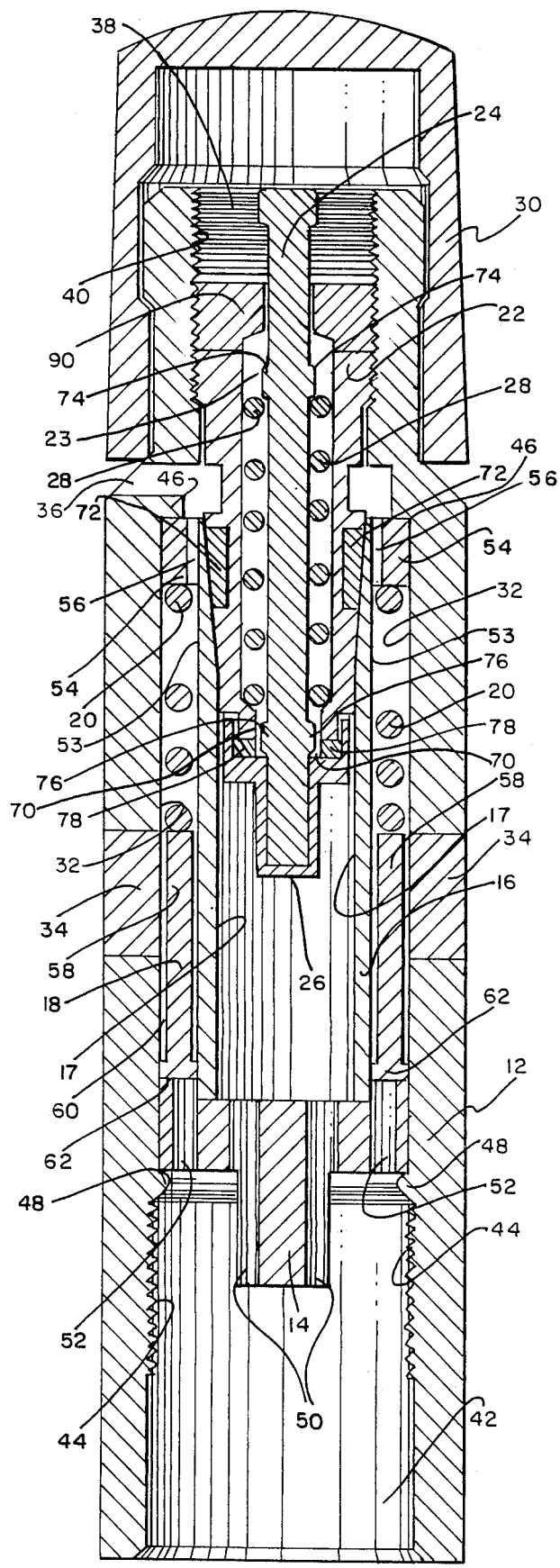
FIG. 7 is a vertical sectional view of the tire pressure indicator when not secured to a valve stem of a pressurized tire, and where the lower indicator sleeve is completely flushed against the inner cap from the biasing of the pre-calibrated spring that is urging against the upper indicator sleeve in contact with the lower indicator sleeve.

With continuing reference to the drawings for operation of the invention, the tire pressure indicator 10, under atmospheric conditions and not secured to a valve stem of a tire (see FIG. 7), has the indicator sleeve means 18 biased fully downwardly such that the spring 20 has the lower sleeve 60 flushed against the inner cap 14 as there is no pressurized air entering through apertures 52 to exert pneumatic pressure against the bottom of the flanged sleeve bottom 62.

Figure 2:
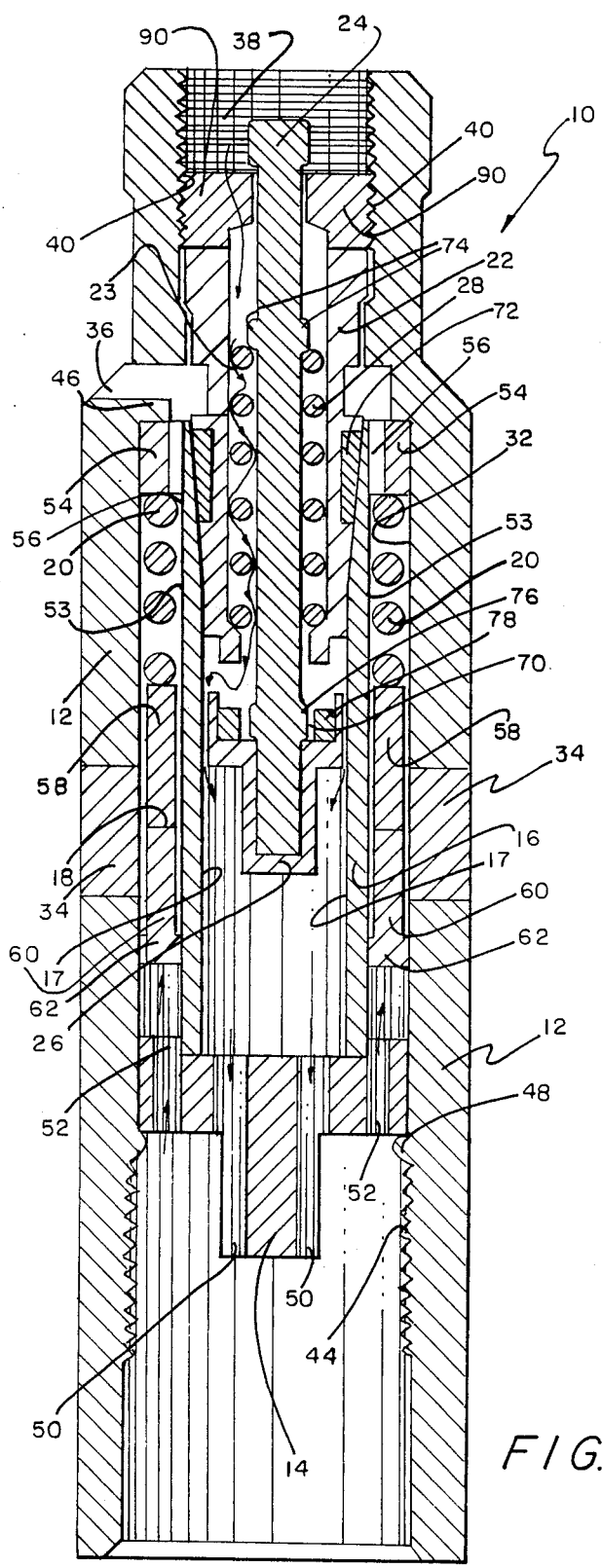
FIG. 2 is a vertical sectional view of the tire pressure indicator having the control rod depressed with air being discharged around the control rod and around the valve core cap secured to the bottom of the control rod to pressurize a tire having the tire pressure indicator mounted to a valve stem thereof.
Figure 3:
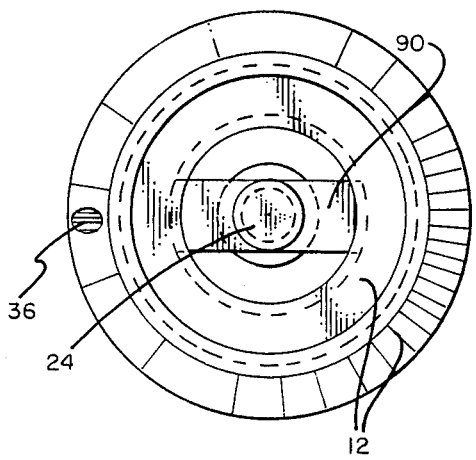
FIG. 3 is a top plan view of the tire pressure indicator.
Figure 4:
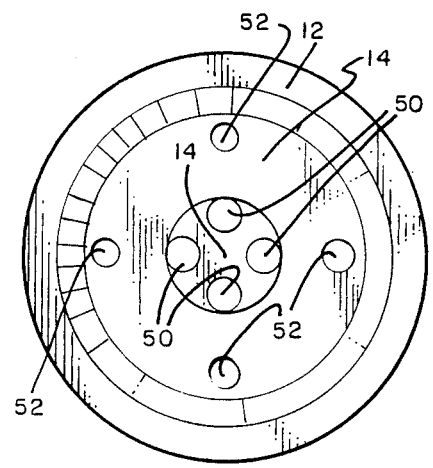
FIG. 4 is a bottom plan view of the tire pressure indicator.

The bottom threads 44 of the pressure indicator 10 are engaged to the threads of a conventional valve stem of a tire, and cap 30 is removed to expose the top of rod 24. A head of a conventional air hose is disposed over the top of the outer body 12 to depress the rod 24 (including the attached valve core cap 26) downward to discharge air into the longitudinal bore 23, through the bore opening 70, around the valve core cap 26, and through the apertures 50 of the inner cap 14, all as shown by the arrows in FIG. 2. As the tire pressurizes, pressurized air passes through aperture 52 and commences to exert pressure against the bottom of the flanged sleeve bottom 62 of the lower sleeve 60 which, in turn, causes the upper and lower sleeves 58 and 60 to start moving towards the bottom of the inner body collar 54 and the compression of spring 20. When the desired pressure has been obtained in the tire, the color of the lower sleeve 60 should be clearly visible through the transparent window 34 and no part (or color) of the upper sleeve 58 is to be seen, as illustrated in FIG. 5; and the head of the conventional air hose should be released from around the top of the outer body 12 to stop the flow of pressurized air through the longitudinal bore 23 and cause the spring 28 to urge the rod 24 upwardly to force the seating of the valve core cap 26 against the bottom of the valve core body 22 to seal-off the bore opening 70, as further illustrated in FIG. 5. With the passage of time and inevitably, the tire will lose some of its pressure, which causes the calibrated spring 20 to move the upper and lower sleeves 58 and 60 downwardly such that the upper sleeve 58 (including its color) is visible, indicating that more air is needed for the tire (see FIG. 1). It should be noted that what keeps the lower sleeve 60 always in contact with the upper sleeve 58 as shown in FIGS. 1, 2 and 5 is that the pressure of the air in the tire that is being urged against the bottom of the flanged bottom 62 of the lower sleeve 60 is greater than the pressure of the calibrated spring 20 that is being urged against the upper sleeve 58 (and the bottom sleeve 60).

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A visual tire pressure indicator comprising an outer body having a structure defining an inner wall, a transparent outer body section, a vent aperture, a top opening internally lined with top threads and a bottom opening internally lined with bottom threads;

an inner cap fitted against the inner wall of the outer body and having at least one air inlet aperture wherethrough air is emitted and at least one air outlet aperture wherethrough air passes;

an inner body having an outer wall, an inner wall, and secured to said inner cap;

an indicator sleeve means slidably disposed around said inner body;

a calibrated spring means helically surrounding said inner body and contacting a top end of said indicator sleeve means for biasing said indicator sleeve means towards said inner cap;

a valve core body threadably engaged to the top threads and fitted against the inner wall of the inner body, said valve core body having a structure defining a longitudinal bore;

an air flow control rod slidably disposed in said longitudinal bore;

a valve core cap secured to said air flow control rod; and a valve core spring means disposed around said air flow control rod and in said longitudinal bore for biasing said valve core cap against the valve core body.

2. The visual tire pressure indicator of claim 1 wherein said outer body additionally comprises a protruding outer body collar circumscribing the bottom opening above the bottom threads.

3. The visual tire pressure indicator of claim 2 where said inner cap is flushed against said protruding outer body collar.

4. The visual tire pressure indicator of claim 1 wherein said inner body terminates in an inner body collar having a structure defining at least one collar aperture.

5. The visual tire pressure indicator of claim 1 wherein said indicator sleeve means comprises an upper sleeve and a lower sleeve with a flanged sleeve bottom to form an airtight seal between the outer wall of the inner body and the inner wall of the outer body.

6. The visual tire pressure indicator of claim 4 wherein said outer body is formed with an inner ledge whereagainst said inner body collar is flushed.

7. The visual tire pressure indicator of claim 4 wherein said calibrated spring means is disposed between said inner body collar and said indicator sleeve means.

8. The visual tire pressure indicator of claim 1 wherein said longitudinal bore has a bore diameter and tapers into a bottom core opening having a smaller diameter than the bore diameter of the longitudinal bore.

9. The visual tire pressure indicator of claim 1 wherein said air flow control rod has an upper protruding ridge and a lower protruding ridge.

10. The visual tire pressure indicator of claim 9 wherein said valve core spring means is disposed between said upper protruding ridge and said bottom core opening.

11. The visual tire pressure indicator of claim 1 wherein said valve core spring means is in contact with said upper protruding ridge and said valve core cap is secured to said air flow control rod below said lower protruding ridge.

12. The visual tire pressure indicator of claim 1 wherein said valve core body additionally comprises a valve core gasket embedded in the structure thereof and flushed against the inner wall of the inner body.

13. The visual tire pressure indicator of claim 1 wherein said valve core cap additionally comprises a valve core gasket secured thereto for seating against the bottom of the valve core body.

14. The visual tire pressure indicator of claim 1 wherein said valve core body is integrally formed with a core head wherethrough said control rod slidably passes.

15. The visual tire pressure indicator of claim 14 wherein said core head threadably secures to said top threads of said outer body.

16. A visual tire pressure indicator comprising an outer body having a structure defining an inner wall, a transparent outer body section, a vent aperture, a top opening internally lined with top threads and a bottom opening internally lined with bottom threads;

an inner cap fitted against the inner wall of the outer body and having at least one air inlet aperture wherethrough air is emitted and at least one air outlet aperture wherethrough air passes;

an inner body having an outer wall, an inner wall, and secured to said inner cap;

an indicator sleeve means slidably disposed around said inner body;

a calibrated spring means helically surrounding said inner body for biasing said indicator sleeve means towards said inner cap;

a valve core body threadably engaged to the top threads and fitted against the inner wall of the inner body, said valve core body having a structure defining a longitudinal bore;

an air flow control rod slidably disposed in said longitudinal bore;

a valve core cap secured to said air flow control rod; and a valve core spring means disposed around said air flow control rod and in said longitudinal bore for biasing said valve core cap against the valve core body; said outer body additionally comprises a protruding outer body collar circumscribing the bottom opening above the bottom threads; said inner cap is flushed against said protruding outer body collar said inner body terminates in an inner body collar having a structure defining at least one collar aperture; said indicator sleeve means comprises an upper sleeve and a lower sleeve with a flanged sleeve bottom to form an airtight seal between the outer wall of the inner body and the inner wall of the outer body; said outer body is formed with an inner ledge whereagainst said inner body collar is flushed; said calibrated spring means is disposed between said inner body collar and said indicator sleeve means; said longitudinal bore has a bore diameter and tapers into a bottom core opening having a smaller diameter than the bore diameter of the longitudinal bore; said air flow control rod has an upper protruding ridge and a lower protruding ridge; said valve core spring means is disposed between said upper protruding ridge and said bottom core opening; said valve core spring means is in contact with said upper protruding ridge and said valve core cap is secured to said air flow control rod below said lower protruding ridge; said valve core body additionally comprises a valve core gasket embedded in the structure thereof and flushed against the inner wall of the inner body; said valve core cap additionally comprises a valve core gasket secured thereto for seating against the bottom of the valve core body; said valve core body is integrally formed with a core head wherethrough said control rod slidably passes; and said core head threadably secures to said top threads of said outer body.

* * * * *